United States Patent [19]

Stout et al.

[11] Patent Number: 4,543,700
[45] Date of Patent: Oct. 1, 1985

[54] METHOD OF DETACHABLY SECURING AN EXPLOSIVE CHARGE CONTAINER IN A HOLLOW CARRIER FOR A PERFORATING DEVICE

[75] Inventors: Gregg W. Stout, Montgomery; John A. Nelson, Spring, both of Tex.

[73] Assignee: Baker Oil Tools, Inc., Orange, Calif.

[21] Appl. No.: 599,791

[22] Filed: Apr. 13, 1984

Related U.S. Application Data

[62] Division of Ser. No. 432,481, Oct. 4, 1982, Pat. No. 4,479,556.

[51] Int. Cl.$^4$ .............................................. B23P 19/00
[52] U.S. Cl. .................... 29/426.4; 29/512; 29/526 R; 29/526 A; 403/240; 403/252; 403/256
[58] Field of Search .............. 29/426.4, 509, 512, 29/523, 526 R, 526 A; 102/305, 308, 310, 311, 312; 175/4.51, 4.52, 4.53, 4.54, 4.55, 4.56, 4.6; 403/240, 256, 230, 252

[56] References Cited

U.S. PATENT DOCUMENTS

| | | | |
|---|---|---|---|
| 2,049,101 | 7/1936 | Baker | 29/426.4 X |
| 2,363,436 | 11/1944 | Pancoe | 403/252 |
| 2,957,666 | 10/1960 | Castle | 403/240 X |
| 2,978,921 | 4/1961 | Donohoe | 29/526 R X |
| 3,928,905 | 12/1975 | Atwater | 29/526 A X |
| 3,990,135 | 11/1976 | De Angelis | 29/526 R X |
| 4,175,229 | 11/1979 | Brinkhof | 403/252 X |
| 4,273,047 | 6/1981 | Rommer | 102/310 |
| 4,326,462 | 4/1982 | Garcia et al. | 102/310 |
| 4,451,959 | 6/1984 | Miller et al. | 29/426.4 X |

FOREIGN PATENT DOCUMENTS 512265  4/1955  Canada ............................... 403/252

Primary Examiner—Charlie T. Moon
Attorney, Agent, or Firm—Norvell & Associates

[57] ABSTRACT

The invention provides a subterranean well casing perforating gun device which employs shaped explosive charges to perforate the well casing. The device generally defines an outer tubular housing assembly concentrically insertable in the well and defining a vertical axis, cylindrical chamber. A tubular carrier of polygonal cross sectional configuration is insertable in the chamber in concentric relationship to the cylindrical wall of the cylindrical chamber. Each of the faces of the carrier have a plurality of spaced passages therethrough, each passage having a configuration substantially corresponding to the configuration of the polygonal face. A shaped charge container has its cylindrical body insertable in any selected one of the passages and a radial flange on the outer end for abutting the polygonal face portion adjacent the respective passage, thereby limiting the insertion of each of the containers into the selected passage. Selectively disengageable fastening means are operable from the exterior of the carrier for clamping the radial flange against the respective polygonal face and for selective disengagement therefrom from the exterior of the carrier. The invention also contemplates a method of utilization of the carrier and the gun, as well as to incorporation of same into a particular perforating and gravel packing method and apparatus.

5 Claims, 13 Drawing Figures

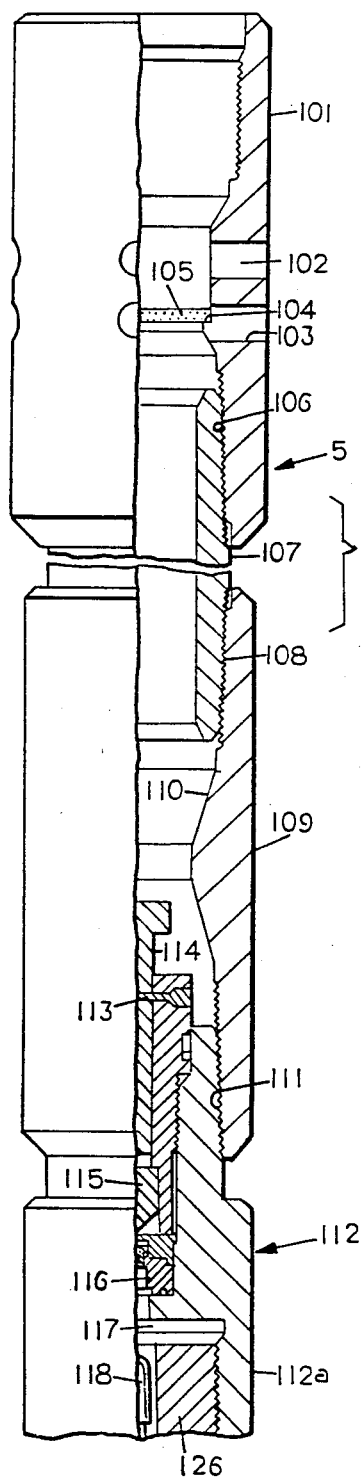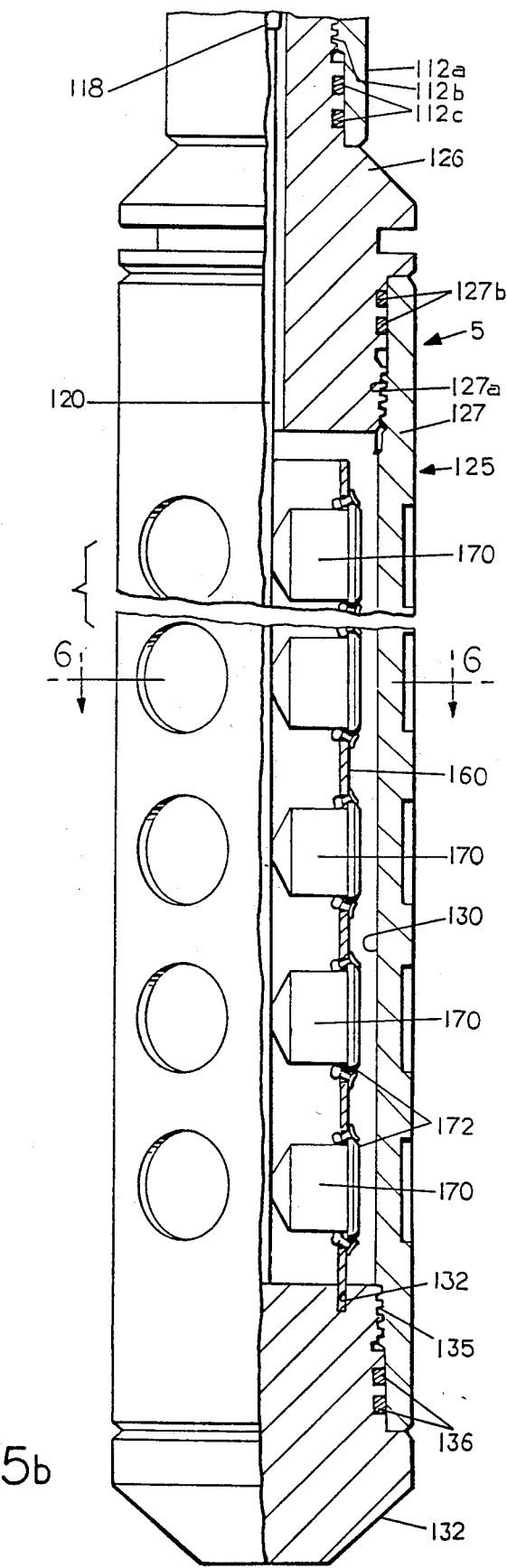
FIG. 5a
FIG. 5b

METHOD OF DETACHABLY SECURING AN EXPLOSIVE CHARGE CONTAINER IN A HOLLOW CARRIER FOR A PERFORATING DEVICE

CROSS-REFERENCE TO RELATED APPLICATION

This application is a Divisional Application of co-pending Ser. No. 432,481, filed Oct. 4, 1982, now Pat. No. 4,479,556, entitled "Subterranean Well Casing Perforating Gun".

BACKGROUND OF THE INVENTION

1. FIELD OF THE INVENTION

This invention relates to a method and apparatus for securing perforating charges to a carrier as well as to effecting the perforating and the gravel packing of a production zone in a subterranean well.

2. DESCRIPTION OF THE PRIOR ART

As oil and gas wells are drilled to constantly increasing depths, the cost of completion or workover of a well is disproportionally increased by the number of trips of completion apparatus that must be made into the well in order to effect its completion or workover. Necessarily, every encased producing well has to have the casing perforated in the production zone. It is equally necessary in the case of many wells to provide gravel packing in the area of the perforations to filter out sand produced with the production fluids and thus prevent its entry into the well bore and into the production conduit. It has heretofore been necessary to make several trips of a work string into the well in order to first effect the perforation of the well casing and then the gravel packing of one or more production zones surrounding the perforations. Most commonly used tubing conveyed perforating apparatus rely upon percussion firing of explosive charges. Such firing is produced by dropping a weight through the tubular work string to fire a primer carried by the perforating apparatus located at the bottom of the well. It is therefore necessary that the bore of the tubular work string be initially unrestricted, at least to the extent to permit the free passage of the firing weight or bar therethrough.

It has previously been suggested that the gravel packing of a plurality of production zones of a well could be accomplished in a single trip of a specially designed gravel packing apparatus into the well. Such apparatus is, for example, disclosed in U.S. Pat. No. 3,987,854 to Callihan et al. and also in the co-pending application Ser. No. 170,494, filed July 21, 1980, now abandoned, and assigned to the assignee of the present application. In both instances, however, the crossover tool which forms an essential part of such multiple zone gravel packing apparatus, has not provided an unrestricted axial passage through the crossover apparatus. Therefore, it has been a practical impossibility to enter the well with both a perforating apparatus and a gravel packing apparatus and accomplish both operations in the same trip.

Additionally, since the entire perforating operation is to be performed in the same single trip, it is highly desirable that the perforating gun be capable of adjustment in the field of both the total number and the horizontal and vertical spacings of the spaced charges employed in the perforating operation. Many times some charges must be removed after initial assembly. An economical apparatus permitting the convenient field assembly or disassembly of a plurality of spaced charges on a tubular carrier in any desired vertical and horizontal configuration has not heretofore been available.

Additionally, shaped charge explosives are very popular and there is a growing tendency to employ as large a diameter shaped charge container as permitted by the internal dimensions of the well casing. This requires that the wall thickness of the shaped charge container be maintained at a minimum. When employing a tubular polygonal carrier to mount the shaped charge containers, as disclosed and claimed in the above mentioned parent application, an annular groove was provided in the wall of the shaped charge container to receive a C-ring after insertion of the body portion of the container through an appropriate opening in the wall of the tubular polygonal carrier. The groove in the container wall required to mount the C-ring necessarily subtracts from the diametrical space available for receiving the shaped charge within the shaped charge container. Moreover, such C-rings, being inside the carrier, were very difficult to remove, if disassembly of the shaped charge container were required.

SUMMARY OF THE INVENTION

This invention provides an improved apparatus for the completion of subterranean oil wells which permits the perforation of the casing at a production zone in the well and the subsequent gravel packing of a liner, screen or other filtering means positioned adjacent to the casing perforations with a single trip of the required apparatus into the well, following which the mandrel element of the gravel packing apparatus may be removed from the well, and the work string replaced by production tubing, permitting the well to be placed immediately in production.

To provide any desired number and spacing of shaped charges for effecting the perforation of the well casing and the adjoining formation, this invention provides a tubular housing assembly which is connected by conduit to the bottom end portion of the gravel packing apparatus. Such tubular assembly defines at least one generally cylindrical, vertical axis chamber in which a plurality of shaped charges are mounted. A primer cord in the chamber is energized by a percussion actuated detonator which may be activated by dropping a ball, bar or other device through the gravel packing apparatus. In one aspect of the invention, the shaped charges are disposed within the cylindrical chamber by being mounted on the planar sides of a tubular carrier having a polygonal shaped cross section with an even number of sides and at least six such sides. Vertically spaced apertures are provided in each of the planar sides of the polygonal carrier to effect the mounting of the spaced charges therein. The apertures are arranged to permit the shaped charge containers to be disposed in a plurality of vertically spaced, horizontal groups with the containers of each horizontal group being angularly displaced relative to the containers in the vertically adjacent horizontal group by 360°/N, where N equals the number of sides of the polygonal carrier. The resulting perforations are thus uniformly distributed around the periphery of the well casing and also vertically spaced over a length corresponding to the formation height, but with the vertically adjacent perforations being unaligned in a vertical direction.

The apparatus of this invention may incorporate a unique crossover flow control mandrel for a gravel packing apparatus which, in its run-in position, defines an unimpeded axial passage through the entire gravel packing apparatus. This permits a firing weight to be freely dropped through the gravel packing apparatus to fire the perforating gun disposed at the bottom end of the gravel packing apparatus.

During the run-in and perforating operations, a radial passage through the gravel packing mandrel, which provides communication from the interior of the bore of the mandrel through the annular fluid passage surrounding such bore into the annulus between the mandrel and the liner assembly, is closed by a sleeve which carries a ball valve seat at its upper end. The sleeve is retained in this position by a shear pin. Following the perforating operation, a ball is dropped onto the ball seat permitting fluid pressure within the work string to be increased sufficiently to set a fluid pressure operated packer. Further increase in pressure will cause a shearing of the shear pin and a downward movement of the ball seat sleeve to uncover the radial passage in the crossover mandrel assembly, thus restoring the fluid flow passages through the crossover mandrel to their normal configuration which permits the flow of gravel carrying fluid downwardly through the bore of the mandrel, thence outwardly through the uncovered radial passage into the annulus between the mandrel and the sleeve assembly, thence outwardly into the annulus between the liner assembly and the casing, and thence downwardly into the area between the screen and the casing perforations. The return fluid passes through the screen, thence into the annular passage surrounding the bore of the mandrel, and thence outwardly into the casing annulus through a radial port located above the packer, in conventional fashion.

Additionally, in one aspect, this invention provides a flapper valve below the ball valve which is normally held in an inoperative position relative to the continuous axial passage through the gravel packing apparatus until after the perforation of the well has been accomplished by the dropping of the firing weight, and the work string has been pressurized above the ball seat sleeve. Such flapper valve is held in its open position by a retaining sleeve and is spring biased to a closed position. The flapper valve is caused to move to its closed position after completion of the perforating operation by downward movement of the ball seat sleeve, and isolates the bore of the screen, hence the formation, from reverse fluid flow after the gravel packing is accomplished.

This invention further provides a mounting for shaped charge containers on a tubular polygonal carrier suspended on a gravel packing apparatus which permits the field assembly (or disassembly) of any selected number of containers on the tubular carrier in any one of a variety of arrays. Each shaped charged container is provided with a radial flange adjacent its outer end. The assembly is accomplished by providing a pair of grooves or slots in the wall of the opening provided in the tubular carrier for receiving the shaped charge container. Such slots permit a fastening means, such as a blind rivet, to be inserted from the exterior of the housing and both ends of the fastening means expanded respectively into engagement with the inner wall of the housing and the outer wall of the radial flange provided on the outer end of the shaped charge container.

With each of the modifications of this invention, the assembly of the shaped charge containers onto the tubular carrier is accomplished by operations performed on the exterior of the carrier. More importantly, in the event that it is desired to remove one or more of the assembled shaped charge containers from the tubular carrier, the removal of the fastening means may be conveniently accomplished by simple operations performed on the exterior of the carrier. It is thus assured that both the assembly and disassembly operations may be conveniently effected by field personnel.

BRIEF DESCRIPTION OF THE DRAWINGS

FIGS. 1a and 1b constitute a schematic vertical sectional view of a combined perforating and gravel packing apparatus incorporating this invention, shown with the components thereof in their run-in positions, FIG. 1b being a vertical continuation of FIG. 1a.

FIGS. 5a and 5b collectively constitute a vertical sectional view of a perforating gun which is preferred for use with the gravel packing apparatus of FIGS. 1a and 1b.

DESCRIPTION OF THE PREFERRED EMBODIMENTS

Figure 1A:
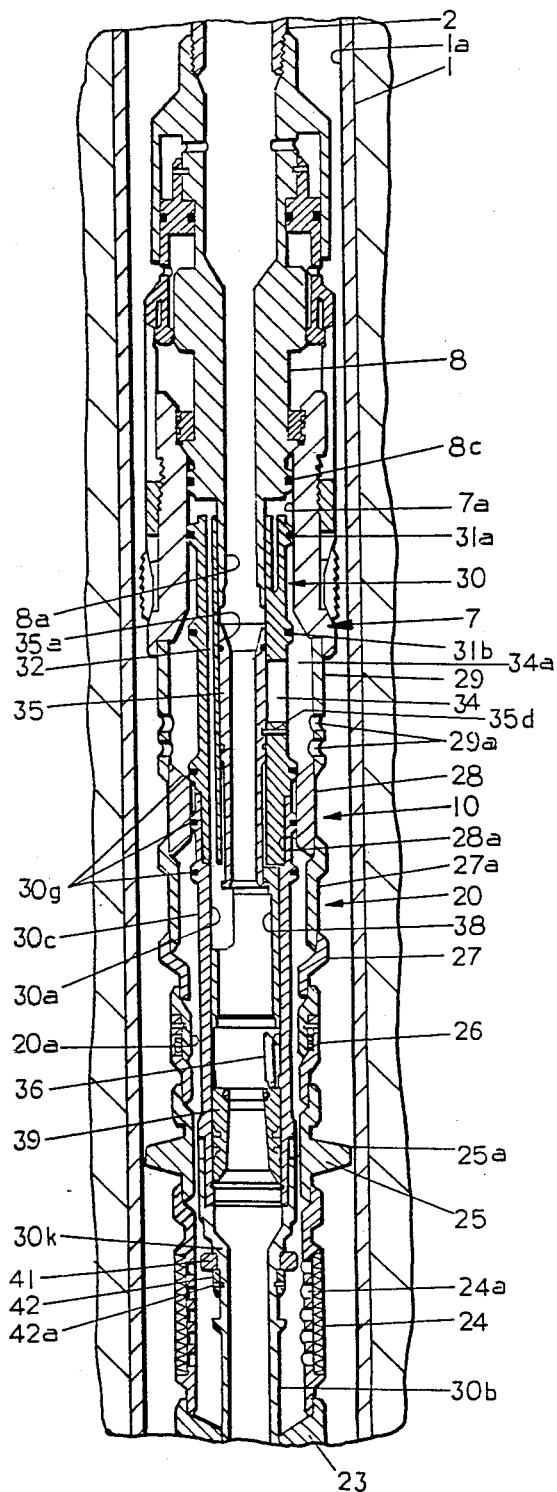
Figure 1B:
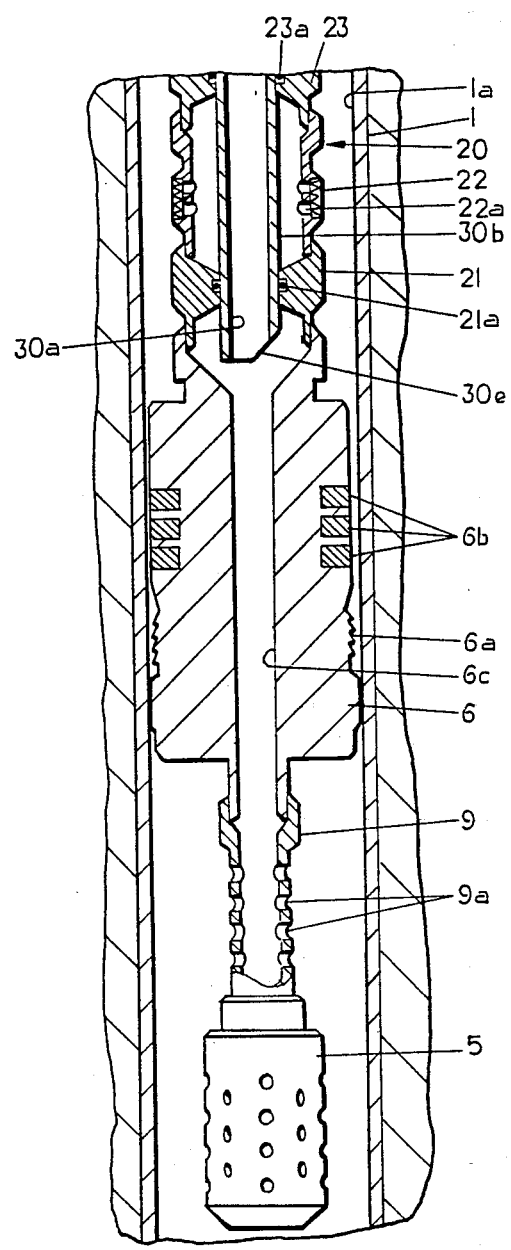

Referring now to FIGS. 1a–1b, there is shown a combined gravel packing and perforating apparatus 10 embodying this invention with all of the elements of the apparatus shown in their "run-in" position within the bore 1a of a well casing 1. Major components of the apparatus 10 include a percussion actuated perforating gun 5, (shown schematically) which is supported in depending relationship from a first packer element 6 by a nipple 9 having radial wall perforations 9a. The packer element 6 is in turn suitably secured to the bottom end of a hollow liner assembly 20. On the top end of the liner assembly 20, a second packer 7 is conventionally secured. The packer 7 is of the type having a fluid pressure responsive actuator 8 which is detachably secured to the packer 7 and has its upper end secured to the end of a tubular work string 2. Depending from the actuator 8 is a hollow crossover mandrel 30. The axial bore 30a of the hollow crossover mandrel 30 extends entirely through the length of the assembly and is in direct communication with the bore 6c of the lower packer 6 and the bore of the nipple 9, hence providing direct communication with the percussion actuated perforating gun 5.

The perforating gun 5 may be any one of several well known types which contains explosive charges which are detonated to fire a plurality of radially directed charges through the walls of the casing 1, thus producing casing perforations (not shown) and associated perforations in the surrounding production zone of the well bore. A preferred gun structure is illustrated in FIGS. 5a and 5b and will be subsequently described. From the description thus far, it will be readily apparent that in the run-in position of the combined perforating and gravel packing apparatus, there is provided an unrestricted axial passage from the tubular work string 2 to the perforating gun 5, thus permitting a detonating weight or bar (not shown) to be dropped into the gun 5 from the top of the well to effect its discharge and the production of perforations in the well casing and the surrounding production zone.

Referring now to FIGS. 5a and 5b, there is illustrated a preferred form of perforating gun 5 for employment with the gravel packing apparatus heretofore described. The gun 5 comprises a ported sub 101 which is substituted for the ported conduit 9 and achieves the threaded connection of the perforating gun to the bottom end of the lower packer 6. Sub 101 includes a plurality of peripherally spaced radial ports 102 and 103. Port 103 is located in the immediate vicinity of an upwardly facing shoulder 104 on which frangible disc 105 is seated. Disc 105 provides protection for the detonating components of the perforating gun against inadvertent activation by debris falling through the well. Frangible disc 105 is preferably formed from a sheet of glass having sufficient strength to require the dropping of a detonating weight thereon to achieve its breakage. The ports 102 and 103 permit the flushing of the upper surface of the frangible disc 105 by fluid introduced through the work string to remove debris therefrom through such ports.

The lower end of ported sub 101 is provided with internal threads 106 which are engaged with the top end of a pup joint 107 having a lower threaded portion 108 threadably engaged with a guide sleeve 109. Guide sleeve 109 is provided with an inwardly sloped surface 110 which functions to direct any detonating weight dropped toward the center of the bore of the guide sleeve 109.

The lower end of guide sleeve 109 is secured by threads 111 to a firing head 112. Firing head 112 is of conventional configuration, having an upwardly projecting hammer 114 secured in elevated position relative to a firing pin 115 by a shear pin 113. Firing pin 115 in turn is positioned immediately above a detonating cartridge 116 which is in communication with an enlarged chamber 117 and a booster charge 118 disposed in the upper end of an annular housing hanger 126. The booster charge 118 comprises any conventional form of blasting cap, such as the C63 booster, manufactured by DuPont.

The lower end 112a of the firing head 112 is sealably secured to the top end of a tubular housing assemblage 125 by threads 112b and O-rings 112c (FIG. 5b). Tubular housing assembly 125 comprises the annular hanger 126, and a chamber defining sleeve 127. Chamber defining sleeve 127 is secured to the lower end of the hanger 126 by threads 127a, and O-rings 127b seal the threaded connection. The sleeve 127 defines a vertical axis cylindrical chamber 130. The lower end of the chamber 130 is sealed either by a bull plug 132 or by an annular connector box (not shown). The connector box is employed if it is desired to provide an additional chamber for the mounting of additional explosive charges in the manner described in the aforesaid parent application.

Threads 135 and O-rings 136 effect the sealed mounting of the bull plug 132.

The mounting of a plurality of perforating charges within the vertical axis cylindrical chamber 130 is accomplished most conveniently through the utilization of a supporting strip or carrier 160 having a polygonal configuration. For reasons to be hereinafter developed, the polygonal configuration includes an even number of sides and a minimum of six sides. In other words, the carrier 160 has a polygonal cross section including N sides where N is an even number not less than six.

Figure 6:
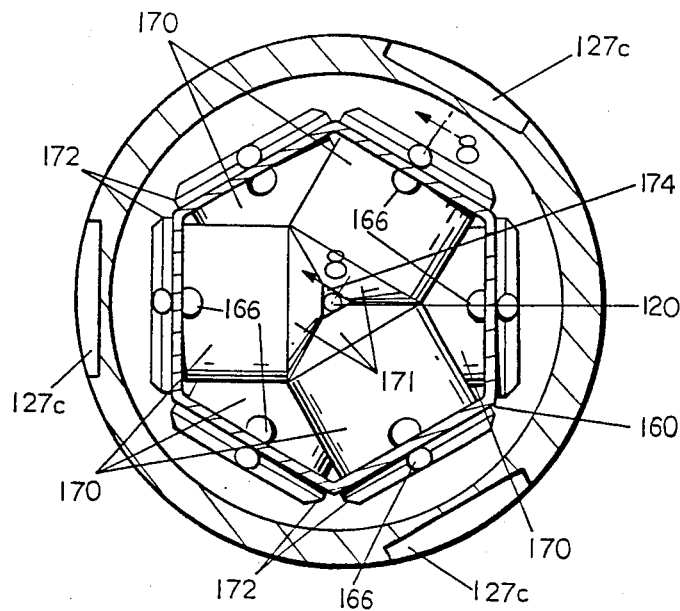
FIG. 6 is a sectional view taken on the plane 6—6 of FIG. 5b.

The reason for this specific configuration may be readily appreciated by reference to the cross sectional view of FIG. 6 wherein the arrangement of the shaped charge containers 170 is indicated for a six sided carrier 160. The shaped charge containers 170 are of generally cylindrical configuration but are provided with an enlarged flange 172 at their outer ends. Flanges 172 abut the planar outer faces of polygonal carrier 160 and maintain the exact radial orientation of the shaped charges when discharged. The inner container ends 171 are conically shaped with the angle of the cone determined by the number of shaped charge containers that are to be disposed in any one horizontal group. This permits the inner ends 171 to lie closely adjacent and define an axial opening 174 for reception of a primer cord 120 which is connected to booster charge 118. The internal construction of the shaped charge (not shown) is conventional.

Figure 10:
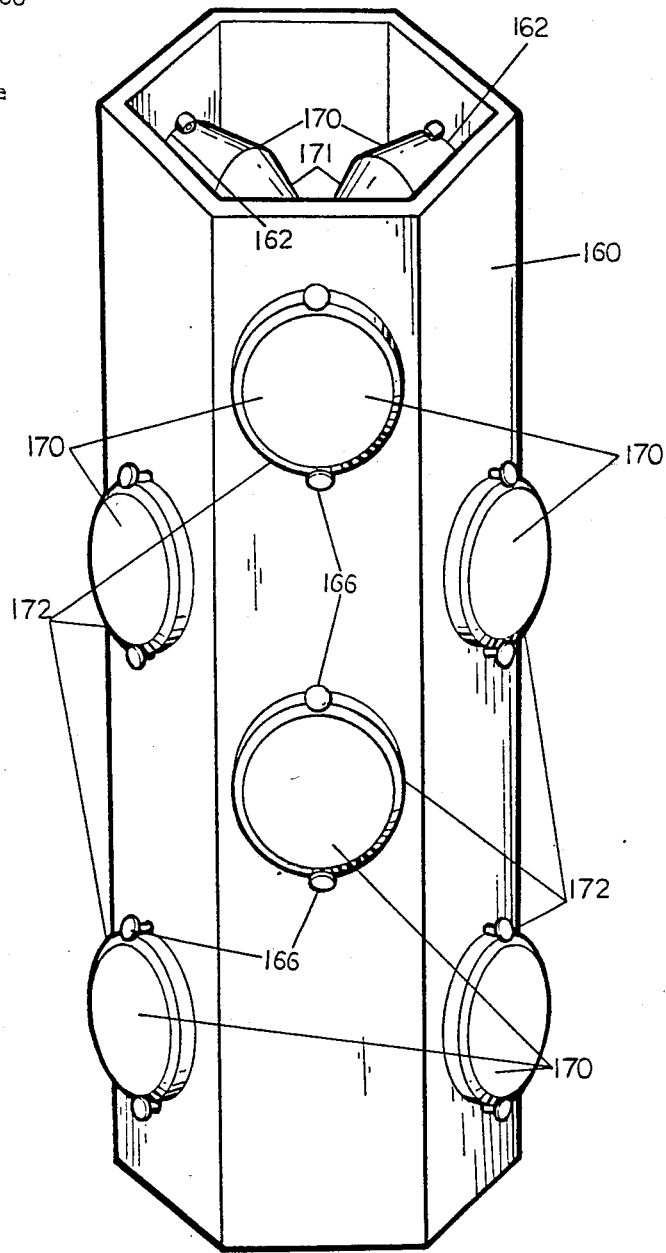
FIG. 10 is a perspective view of a polygonal carrier with shaped charge containers assembled thereto.

The reason for employing a polygonal carrier of not less than six sides is the fact that it is normally not desirable to vertically align the vertically adjacent perforations. The most desirable arrangement of perforations is a plurality of vertically spaced, horizontal groups with the perforations in each horizontal group being angularly displaced from the perforations in the next adjacent horizontal group. Thus, the polygonal carrier 160 is provided with a plurality of vertically spaced apertures 162 (FIG. 10) for respectively receiving the shaped charge containers 170 therein. However, as best shown in the perspective view of FIG. 10, the first horizontal group of shaped charge containers 170 is not axially aligned with the second row of shaped charge containers 170 but is angularly displaced therefrom by 60° or 360°/N wherein N equals six sides. Likewise, the second horizontal group of charge containers 170 is angularly displaced from the third row of charge containers 170, etc. Thus, the polygonal sides of the carrier 160 are apertured so as to produce a plurality of vertically spaced horizontal arrays of shaped charge containers 170, with the containers in each horizontal array being angularly displaced from the containers in the next vertically adjacent horizontal array by an angle equal to 360°/N, where N is the number of polygonal sides.

The reason for utilizing a polygon having an even number of sides is to permit the shaped charge containers mounted thereon to be equally peripherally spaced. If a five or seven sided carrier were employed, the resulting perforations would not be equally angularly spaced around the periphery of the well casing. Moreover, it is desirable that at least a six sided polygonal carrier be employed due to the fact that it is recognized that a four-sided strip would only result in two diametrically opposed perforations being produced, which is not adequate for the majority of producing wells.

As a practical matter, a six-sided polygonal carrier is preferred for the majority of wells. For large well casings, there is sufficient room to adequately mount additional shaped charge containers in each horizontal array and hence an eight-sided carrier or one with a higher even number of sides could be effectively employed.

To minimize the manufacturing cost of the polygonal carrier 160 and ensure its dimensional accuracy, it is preferred to manufacture such carrier by extrusion of an extrudable metal such as aluminum. This then permits the field operation to be stocked with several lengths of six-sided aluminum strips, such as three foot, seven foot and even up to fourteen foot lengths, and corresponding lengths of chamber sleeves 127, and the proper length strip can be selected to permit all of the shaped charge containers to be disposed within a single vertical axis sealed chamber 130 provided by the selected length of chamber sleeve 127. On the other hand, if the height of the producing formation is in excess of fourteen feet, then two or more charge receiving chambers may be fabricated in the field through utilization of a connector box and two or more chamber sleeves, as described in application Ser. No. 366,267, filed Apr. 7, 1982, and assigned to the Assignee of the Instant Application, and the required lengths of polygonal carrier strips 160 can be inserted in the resulting chambers.

As mentioned, the shaped charge containers 170 in chamber 130 have their inner ends 171 each abutting primer cord 120 which extends downwardly from the booster charge 118 contained in the firing head 112. Such primer cord is entirely conventional and may, for example, comprise the flexible cord-type explosive sold under the trademark "Primacord" by the Ensign-Bickford Company of Simsbury, Conn. Usually it is a hollow fabric or plastic tube filled with a well known detonable explosive such as pentaeryphritoltetranitrate, which may be fired by applying a detonating shock at any point along its length and, in the construction heretofore described, the detonating shock is applied by the booster charge 118.

To permit the central symmetric positioning of the polygonal carriers 160 in the chamber 130, the member forming the bottom wall of such chamber is provided with a polygonal groove to receive the bottom end of polygonal carrier 160. Thus, the bull plug 132 is provided with groove 132a. With the carrier 160 thus oriented, the chamber defining sleeves 127 may have reduced wall sections 127c formed therein opposite the known locations of the shaped charge containers 170 to reduce the energy required to blast through such sleeves.

Figure 7:
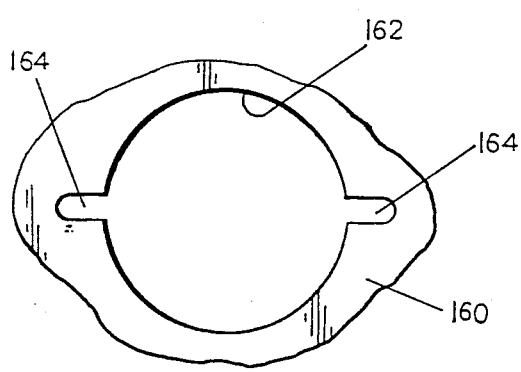
FIG. 7 is an enlarged partial elevational view of the carrier opening for reception of a shaped charge container.
Figure 8:
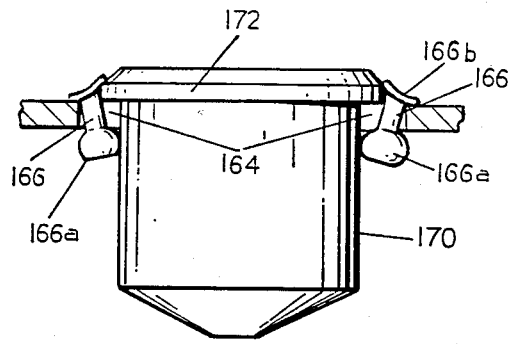
FIG. 8 is an enlarged partial sectional view taken on the plane 8—8 of FIG. 6.
Figure 11:
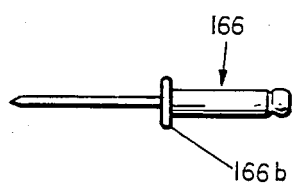
FIG. 11 is an elevational view of an attaching mechanism for use in the present invention.

This invention further provides a method and apparatus for effecting the field assembly of the shaped charge containers 170 onto the faces of the polygonal carrier 160 in the desired array. As shown in FIG. 7, each aperture 162 provided in the polygonal faces of the carrier 160 is provided with at least one, and preferably two, diametrically opposed axially extending slots 164. Slots 164 are of relatively narrow width. The shaped charge containers 170 are then inserted in the holes 162, which are proportioned to permit the ready insertion of the containers 170, until the radial flange 172 on the container abuts the side wall of the particular polygonal face. A blind rivet 166 (FIG. 11) or other affixing means may then be inserted into each of the exposed portions of the slots 164 and operated by a conventional blind riveting gun or other device to simultaneously compress the inner end 166a (FIG. 8) of the blind rivet 166 into a bulbous configuration to prevent its removal from the slot 164, and the outer flanged end 166b is similarly compressed to engage the radial flange 172 and clamp such flange against the outer face of polygonal carrier 160.

Figure 9:
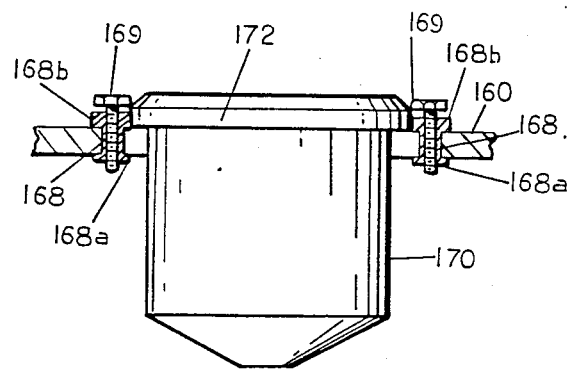
FIG. 9 is a view similar to FIG. 8 but illustrating a modified connector.

An alternative fastening device is shown in FIG. 9. In such figure, the same axial slots 164 are provided on opposed sides of the container receiving hole 162 but a rivet-type nut 168 is inserted in such slot by a conventional blind rivet tool. The nut 168 is compressed by the tool to form an inner flange portion 168a which abuts the walls of the slot 164 while the outer portion 168b is originally headed so as to clamp the rivet nut securely against the respective polygonal wall of the carrier 160. The rivet nut 168 further defines an internally threaded bore within which a headed bolt 169 may be inserted and tightened so as to bring the bolt head into clamping engagement with the container flange 172. As in the case of the other modification, all of the assembly operations are formed exteriorly of the tubular carrier 160.

Of equal importance is the fact that with both modes of fastening the shaped charge containers 170 to the side walls of the polygonal carrier 160, it is equally easy to disassemble such containers in the field. In the case of modification of FIG. 8, the rivets 166 may be snipped off by a pair of shears. In the case of modification of FIG. 9, the clamping bolts 169 can be loosened to release any selected shaped charge container. In either event, the disassembly operations are performed entirely exteriorly of the polygonal carrier 160.

All of the aforedescribed major components of the combined perforating and gravel packing apparatus 10 are assembled to the end of the tubular work string 2 at the well head and are lowered into the casing 1 by the work string 2 until the perforating gun 5 is positioned adjacent a desired production zone.

The lower packer 6 is of the type known in the art as a mechanically actuated, retrievable packer. In other words, through mechanical manipulation of the work string 2, the lower packer 6 may be expanded into sealing engagement with the interior bore 1a of casing 1 at any selected point. Further manipulation of the work string 2 will result in the collapsing of the lower packer 6 to permit it to be moved to another position. The packer 6 may, for example, comprise the Baker Model R-3 Single Grip Retrievable Casing Packer.

Thus, the first step involved in the process after the run-in of the combined perforating and gravel packing apparatus 10 into the well casing is to effect the setting of the lower packer 6 by manipulation of the work string 2. This results in the expansion of gripping teeth 6a and annular seals 6b conventionally provided on the packer into engagement with the casing bore 1a.

As previously mentioned, the top end of the lower packer 6 is conventionally secured, as by threads, to the bottom end of an elongated liner assembly 20. The liner assembly 20 is constructed in the same general manner as the liner assembly employed in the gravel packing apparatus described in the aforementioned U.S. Pat. No. 3,987,854. The construction of the liner assembly 20 will not, therfore, be described in great detail, but the principal elements thereof, starting at the bottom of the liner assembly (FIG. 1b) and moving upwardly, include the following items:

First is an O-ring seal sub 21 providing a mounting for an O-ring seal 21a which cooperates in sealing relationship with the lower tubular portion 30b of the crossover mandrel 30.

Next, the top end of the O-ring seal sub 21 is threadably secured to a conventional telltale screen 22 employed in the gravel packing apparatus. Screen 22 provides a plurality of radially disposed small area passages 22a communicating between the casing annulus and the interior of the hollow screen assembly 22. The passages 22a are sufficiently small in size to provide a barrier for the passage of the size of gravel particles with which the well is to be packed.

The top end of telltale screen 22 is in turn threadably secured to the bottom end of a second O-ring seal sub 23 which defines a support for an O-ring 23a which also sealingly engages the lower tubular portion 30b of the hollow crossover mandrel 30.

The top end of the second O-ring seal sub 23 is threadably engaged to the bottom portion of a main screen 24 around which the primary gravel pack is to be placed. The screen 24 may be of any one of several well known constructions and defines a plurality of radially disposed, restricted area fluid passages 24a which are sized to freely permit fluid flow therethrough from the casing annulus but prevent passage of the gravel particles of the size to be employed in the gravel packing operation.

The top end of the main screen 24 is threadably secured to the lower end of a blank pipe 25 which is provided with a radially projecting centering flange 25a. The top end of the blank pipe 25 is in turn threadably connected to the lower end of a conventional shearout safety joint 26 which permits release of component parts of the apparatus, including the upper packer 7, in the event that the apparatus becomes stuck in the well bore. The shearout safety joint 26 is of conventional construction.

The top end of the shearout safety joint 26 is threadably secured to the lower end of a crossover sub 27 which expands upwardly to a larger interior diameter. The top of crossover sub 27 is threadably secured to the bottom end of a blank pipe 27a which has its top end threadably secured to a seal bore unit 28 which defines an internal sealing surface 28a for cooperation with seals 30g provided on the enlarged upper end 30c of the hollow crossover mandrel 30. Lastly, the top end of seal bore unit 28 is threadably secured to a connecting sleeve 29 having radial passages 29a formed therein and its top end threadably secured to the lower end of the upper packer 7.

The upper packer 7 may be any one of several well known types which may be set by the fluid pressure operated actuator 8. For example, upper packer 7 may comprise Baker model "SC-1 Packer". Since the construction and operation of this type of actuator and packer is entirely conventional, it will not be further described. The actuator 8 is detachably secured to upper packer 7 in conventional fashion and threadably secured at its top end to the lower end of the tubular work string 2.

A hollow crossover mandrel 30 is suitably secured in depending relation to actuator 8 by engagement with a depending sleeve portion 8a of actuator 8. Starting from the top of the crossover mandrel 30, there is first provided a pair of axially spaced, annular seats for seals 31a and 31b. Seal 31a slidably and sealingly engages a seal bore surface 7a formed in the upper packer 7. The seal 31b provides sealing engagement with the bore 7a of the packer 7 when the crossover mandrel is raised relative to the packer by actuator 8 in a manner to be hereinafter described.

The mandrel assembly 30 also defines a partially annular fluid passage 32, open at its top end, which extends downwardly and has a semi-annular lower end 32a (FIG. 2) communicating with the bore 30a extending through the upper portion 30c and the lower end 30b of the mandrel assembly 30.

Near the upper extremity of the enlarged upper portion 30c of the hollow crossover mandrel, a radial crossover port 34 is provided which permits fluid to pass from the axial bore 30a of the hollow mandrel to the exterior of the mandrel, passing through, but not communicating with the partial annular passage 32. Port 34 thus provides communication between the mandrel bore 30a and the annulus 34a that exists between the exterior of the hollow crossover mandrel 30 and the interior bore 20a of the liner assembly 20.

Figure 2:
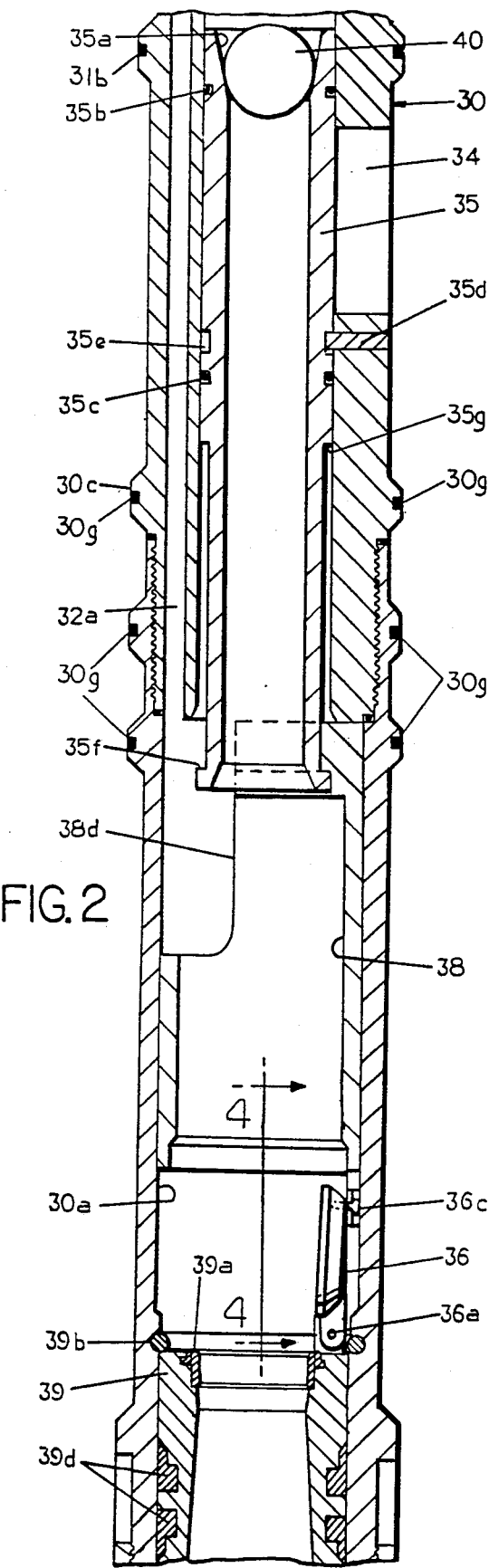
FIG. 2 is an enlarged scale vertical sectional view of a portion of the apparatus of FIG. 1a, illustrating in particular, the mounting of the flapper valve, with the valve shown in its open position.

In the run-in position of the hollow crossover mandrel, the crossover port 34 is closed by a sleeve 35 which defines at its upper end, an annular ball valve seat 35a (FIG. 2). Annular seals 35b and 35c on sleeve 35 respectively located above and below the crossover port 34 assure that such port will be sealed by sleeve 35 against any fluid flow from the bore 30a of the hollow crossover mandrel 30. The ball valve seat sleeve 35 is retained in the aforedescribed position with respect to the crossover port 34 by a shear pin 35d in the mandrel wall which engages a suitable annular groove 35e in the outer periphery of the sleeve 35.

Figure 3:
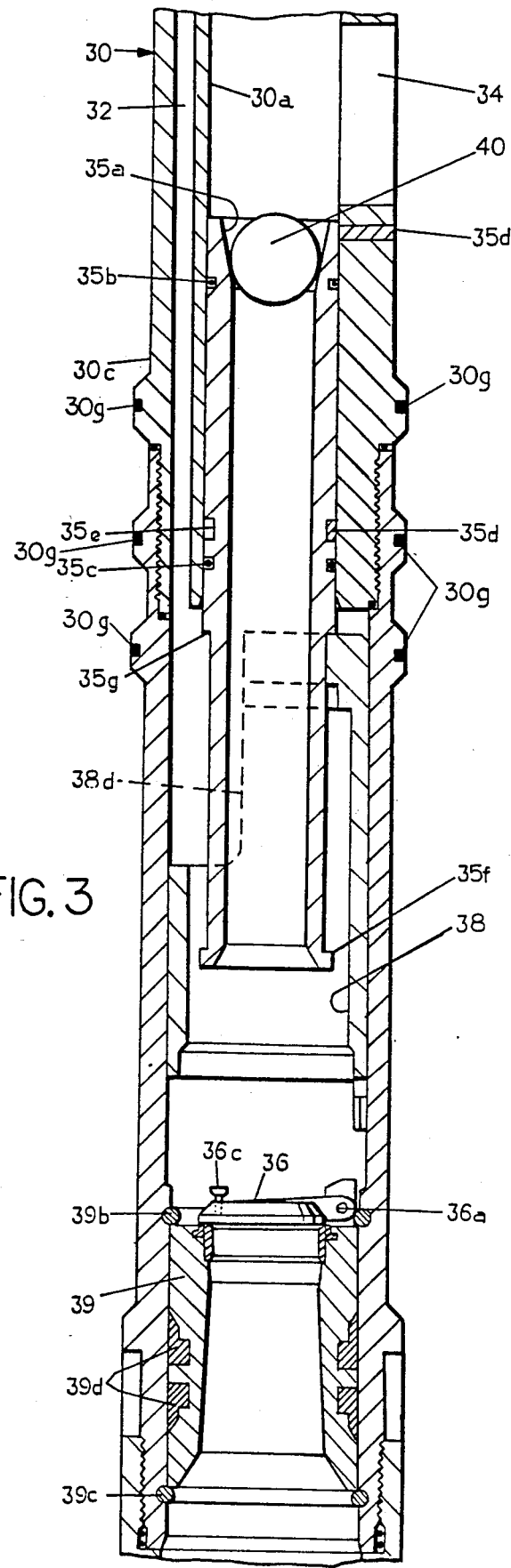
FIG. 3 is a view similar to FIG. 2 but showing the flapper valve in its closed position.

Below the position of the ball valve seat sleeve 35, a flapper valve 36 is mounted for movement about a horizontal pin 36a from a vertical position, in which it does not significantly obstruct the bore 30a of the hollow crossover mandrel, to a horizontal position, shown in FIG. 3, wherein it cooperates with an upwardly facing, annular sealing surface 39a (FIG. 2) surrounding bore 30a. The flapper valve seat 39a is defined on the top portion of a second valve sealing sleeve 39 which is secured in a fixed position in the axial bore 30a of the hollow crossover mandrel 30 by a pair of C-rings 39b and 39c (FIG. 3) respectively engaging the top and bottom surfaces of the sleeve 39 and appropriate grooves formed in the bore 30a of upper mandrel portion 30c. Conventional sealing elements 39d are provided between the external surface of the sleeve 39 and bore 30a to prevent fluid leakage between the external surface of the valve seat 39 and the bore surface 30a of the hollow crossover mandrel 30. A torsion spring (not shown) is provided for flapper valve 36 to urge it towards its horizontal or closed position.

Figure 4:
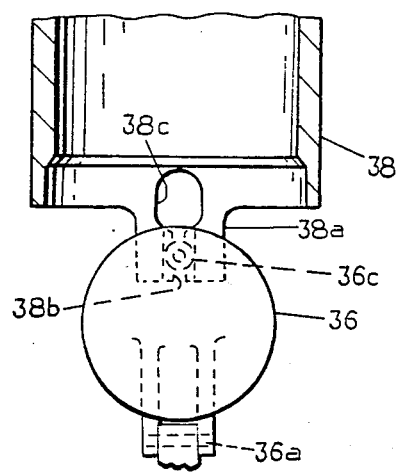
FIG. 4 is a sectional view taken on the plane 4—4 of FIG. 2.

As shown in the enlarged FIG. 4, the flapper valve 36 includes a radially disposed, enlarged head, locking pin 36c. In the run-in position of the crossover mandrel 30, the shank portion of the enlarged head locking pin 36c is disposed within a narrow slot 38b defined by an axial projection 38a formed on the bottom end of a sleeve 38 which in turn is hung onto a radial flange 35f on the bottom end of the valve sleeve 35. The retaining slot 38b provided in the axial projection 38a of connecting sleeve 38 is enlarged at its upper end as shown at 38c so as to permit the headed locking pin 36c of flapper valve 36 to freely pass therethrough and permit the valve to assume its horizontal closed position in engagement with the valve seat 39a whenever the connecting sleeve 38 is moved axially downwardly by displacement of the valve seat sleeve 35 in a manner to be hereinafter described.

The connecting sleeve 38 is provided with a cutout portion 38d extending approximately halfway around the upper portion of the sleeve to provide unimpeded communication between mandrel bore 30a and semi-annular passage 32a.

OPERATION

As previously mentioned, the entire apparatus which has heretofore been described, is run into the well casing 1 on the end of the tubular work string 2 and the perforating gun 5 is positioned opposite a region in the well casing where a production formation exists. With the perforating gun so located, the lower packer 6 is then set by manipulation of the tubular work string 2 (FIG. 2).

A detonating weight, bar or other device (not shown) is then dropped through the tubular work string 2 and passes through the unimpeded axial bore 30a of the hollow crossover mandrel, bore 6c of lower packer 6, and nipple 9 and impacts on the top of the perforating gun 5, discharging the explosive charges contained therein and the charges carried by the gun blast outwardly to produce the perforations in the well casing 1.

Preferably prior to the firing of the perforating gun 5, the bore of the tubular work string 2 is filled with a light density fluid so that when the gun is fired, the work string will be in an "under balanced" condition, i.e., hydraulic fluid pressure at the face of the formation when the gun is fired will be less than the formation pressure, which insures that the formation pressure will force fluid into the well bore and upwardly to the surface. Such light fluid is introduced prior to the setting of the lower packer 6 and is pumped down through the tubular work string 2, displacing any heavier fluid existing in the work string, such as drilling mud, out of the bottom of the inserted apparatus through the perforated nipple 9 below the lower packer and returning to the surface around the outside of the lower packer 6, since it is not yet set.

In most cases, it is desirable to permit oils or other fluid contained in the production formation to freely flow through the new perforations to effect a flushing of such perforations and the fissures in the formation. Such fluid flow enters the axial bore 30a of the hollow crossover mandrel assembly 30 through the perforations 9a provided in the connecting nipple 9 and flows freely up to the work string 2 and then to the top of the well.

After a sufficient flow period to insure the adequate flushing of the perforations, the well flow is closed in conventional fashion by the introduction of a heavy kill fluid downwardly through the tubular work string 2.

As soon as the well is under control by the kill fluid, the lower packer 6 is released by manipulation of the work string 2. The entire assembly is lowered down the well bore so that the main screen 24 is positioned opposite the newly produced perforations. At this position, the lower packer 6 is then reset by manipulation of the tubular work string 2.

The lower packer now in essence becomes a sump packer and is generally permitted to remain in that position.

To initiate the gravel packing operations, the upper packer 7 is set through the application of fluid pressure through the tubular work string 2. To apply such fluid pressure, a ball 40 (FIG. 2) is dropped through the tubular work string and seats on the ball valve seating surface 35a defined by the valve seat sleeve 35. The fluid pressure within the work string and the upper portion of the hollow tubular mandrel assembly 30 may now be increased to a level which will effect the hydraulic operation of the actuator 8 which effects the setting of the upper packer 7 in conventional manner. After setting of the upper packer 7, the fluid pressure within the tubular work string 2 is then increased to an extent that a shearing of the shear pin 35d is accomplished and the ball valve seat sleeve 35 moves downwardly, thus uncovering the crossover port 34 in the crossover mandrel 30 (FIG. 5). Such downward movement is, of course, transmitted directly to the connecting sleeve 38 by a downwardly facing shoulder 35g which moves the enlarged portion 38c of the locking slot 38b into alignment with the locking pin 36c of the flapper valve 36 and permits the flapper valve 36 to shift to its horizontal, closed position as shown in FIG. 3, under the bias of the torsion spring (not shown). The actuator 8 is then released from packer 7 and moved upwardly by work string 2 until an indicator ring 41 (FIG. 1) on the crossover mandrel 30 contacts the bottom of seal bore 28. The hollow mandrel assembly 30 is thus elevated to position its open bottom end 30e at a point above the lowermost O-ring seal sub 21 provided on the lower portion of the liner assembly 20.

As mentioned, the initial raised position of the hollow mandrel assembly 30 is determined by the engagement of the locating ring 41 which surrounds the top portion 30k of the reduced diameter portion 30b of the hollow mandrel assembly 30. Ring 41 is of C-shaped configuration and expanded to engage the bottom end of the seal bore 28. The ring 41 is releasably retained in its expanded position on the crossover mandrel 30 by a sleeve 42 which is slidable upon the lower cylindrical mandrel portion 30b and retained in its uppermost position by one or more shear pins 42a. Thus, when it is desired to raise the crossover mandrel 30 further by raising the work string 2, sufficient upward force is applied to the tubular work string 2 to effect the shearing of the shear pins 42a and this permits the positioning C-ring 41 to move downwardly over the smaller diameter mandrel portion 30b where it will contract so as to freely pass through the bore defined by the seal bore 28. The plurality of axially spaced seals 30g provided on the periphery of the upper enlarged mandrel portion 30c insures that at all times, one or the other of such seals is engaged with seal bore 28 as the vertical position of the hollow mandrel assembly 30 is shifted during the operation of the device for gravel packing.

The fluid pressure within the tubular work string may then be reduced and a gravel carrying fluid introduced into the gravel packing apparatus through the tubular work string 2. The flow path of such gravel carrying fluid through the gravel packing portion of the apparatus 10 is conventional, passing first into the axial bore 30a of the hollow mandrel assemblage and then radially outwardly through the crossover port 34 into the annulus between the crossover mandrel 30 and the the surrounding liner assembly 20. The fluid then flows through the ports 29a provided in the tubular element 29 into the annulus defined between the casing 1 and the outer periphery of the liner assembly 20. The gravel carrying fluid thus flows downwardly through the casing annulus to a position opposite the telltale screen 22. The gravel portion of the fluid will not pass the screen apertures 22a while the fluid passes inwardly to the internal bore 20a of the liner assembly.

The fluid then enters the bottom semi-annular portion 32a of the annular fluid passage 32 provided in the hollow crossover mandrel 30. It cannot flow directly upwardly through the axial bore 30a because such bore is blocked by the ball valve 40 which is subjected to the full downward pressure of the gravel carrying fluid to maintain a sealing engagement with the valve seat 35a provided on the valve seat sleeve 35. The fluid then flows through the top open end of the partial annular passage 32 and into the casing annulus at a point above the sealing surface 7a of the upper packer 7, because the actuator 8 has been shifted upwardly to position the top open end of annular passage 32 above the packer 7.

When the telltale screen 22 is fully covered with gravel, indicating that the gravel has reached the lowermost extremity of the region to be packed, the operator will detect a pressure increase.

Once the operator receives the pressure indication that the telltale screen 22 has been fully packed with gravel, the work string 2 may then be raised upwardly an additional distance, carrying the hollow crossover mandrel 30 with it, to, for example, position the open bottom end 30e of the hollow crossover mandrel assemblage at a position above the seal sub 23 in the liner 20. This then permits the gravel packing operation to continue, with the fluid flow being through the main screen 24, then upwardly through the partial annular passage 32, and then outwardly into the casing annulus at a point above the upper packer 7.

The packing operation is continued until the pressure build up indicates to the operator that the entire main screen 24 and the adjacent perforated area of the formation have been filled with gravel. At this point, there is generally excess gravel in the tubular work string 2 and a reverse fluid flow is applied to the work string 2 to remove the excess gravel. Such reverse flow is, of course, accomplished in conventional fashion by pressurizing the casing annulus and flowing the fluid through the crossover port 34 into the bore 30a of the hollow crossover mandrel 30 and then upwardly through the tubular work string 2. It is during this operation that the flapper valve 36 performs its primary function in that it prevents the reversing fluid from entering the fluid bypass system that goes around the crossover port 34, and going down through the bore 30a of the crossover mandrel 30 to the formation.

Following completion of the removal of the excess gravel, the setting tool or actuator 8, with the hollow crossover mandrel 30 connected thereto, is removed from the well and the well is ready for subsequent testing or production operations.

While the invention has been described in terms of a specific application of the unique perforating gun and crossover mandrel construction to accomplish the perforating of a well and gravel packing the perforated area in a single trip of the apparatus into the well, those skilled in the art will recognize that the described perforating gun may be employed without a gravel packing apparatus connected thereto.

Although the invention has been described in terms of specified embodiments which are set forth in detail, its should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of detachably securing an explosive charge container in a side wall hole in a hollow carrier received within a perforating device for use in a subterranean well, comprising the steps of:
   (1) forming at least one axially extending slot in the wall of the side wall hole;
   (2) providing a radial flange on the outer end of the explosive charge container;
   (3) inserting the explosive charge container in the side wall hole with said radial flange abutting the outer face of the hollow carrier but not overlying all of said slot;
   (4) inserting securing means in the exposed portion of said slot, said securing means having inner and outer ends; and
   (5) moving the inner and outer ends of the securing means to respectively engage the inner wall of the hollow carrier and the outer wall of the flange in clamping relation.

2. The method of detachably securing an explosive charge container in a side wall hole in a hollow carrier received within a perforating device for use in a subterranean well, comprising the steps of:
   (1) forming at least one axially extending slot in the wall of the side wall hole;
   (2) providing a radial flange on the outer end of the explosive charge container;
   (3) inserting the explosive charge container in the side wall hole with said radial flange abutting the outer face of the hollow carrier but not overlying all of said slot;
   (4) inserting securing means in the exposed portion of said slot, said securing means having inner and outer ends; and
   (5) moving the inner and outer ends of the securing means from the exterior of the hollow carrier to respectively engage the inner wall of the hollow carrier and the outer wall of the flange in clamping relation.

3. The method of detachably securing an explosive charge container in a side wall hole in a hollow carrier receivable within a perforating device for use in a subterranean well, comprising the steps of:
   (1) providing a radial flange on the outer end of the explosive charge container;
   (2) inserting the explosive charge container in the side wall hole with said radial flange abutting the outer face of the hollow carrier;
   (3) inserting one of the inner and outer ends of securing means through the side wall of the hollow carrier; and
   (4) moving the inner and outer ends of the securing means to respectively engage the inner wall of the hollow carrier and the outer wall of the flange in clamping relation.

4. The method of detachably securing an explosive charge container in a side wall hole in a hollow carrier receivable within a perforating device for use in a subterranean well, comprising the steps of:
   (1) providing a radial flange on the outer end of the explosive charge container;
   (2) inserting the explosive charge container in the side wall hole with said radial flange abutting the outer face of the hollow carrier;
   (3) inserting one of the inner and outer ends of securing means through the side wall of the hollow carrier;
   (4) moving the inner and outer ends of the securing means to respectively engage the inner wall of the hollow carrier and the outer wall of the flange in clamping relation; and (5) selectively detaching the explosive charge container from clamped relation relative to the hollow carrier by disengaging at least one of the inner and outer ends of the securing means from the respective inner and outer walls by movement of the securing means exterior of the outer wall of the hollow carrier.

5. The method of detachably securing an explosive charge container in a side wall hole in a hollow carrier receivable within a perforating device for use in a subterranean well, comprising the steps of:

(1) forming at least one axially extending slot in wall of the side wall hole;
(2) providing a radial flange on the outer end of the explosive charge container;
(3) inserting the explosive charge container in the side wall hole with said radial flange abutting the outer face of the hollow carrier but not overlying all of said said slot;
(4) inserting a rivetable device in the exposed portion of said slot;
(5) expanding the inner end of the rivetable device to engage the inner wall of the hollow carrier; and
(6) activating the rivetable device to engage the outer wall of the flange in clamping relation thereto.

* * * * *